L. B. BROWN.
Cotton-Planter.
No. { 103, 31,107 }
Patented Jan. 15, 1861
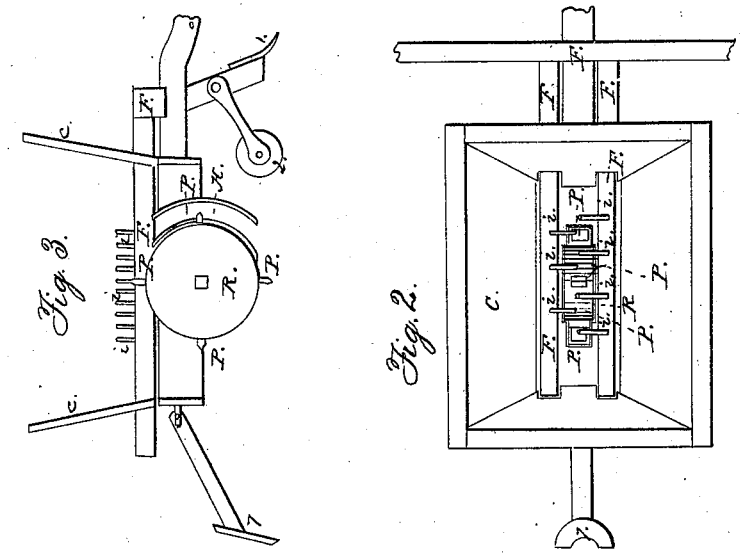
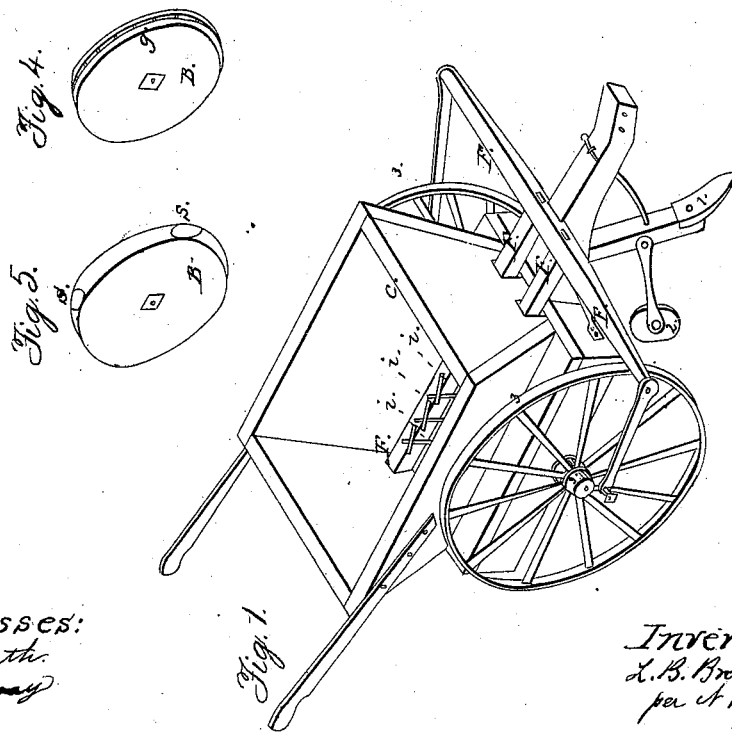

UNITED STATES PATENT OFFICE.

LEWIS B. BROWN, OF SCREVEN COUNTY, GEORGIA.

IMPROVEMENT IN COTTON-SEED PLANTERS.

Specification forming part of Letters Patent No. 31,107, dated January 15, 1861.

*To all whom it may concern:*

Be it known that I, LEWIS B. BROWN, of Screven county, State of Georgia, have invented a new and useful machine for planting and drilling cotton-seed and corn and other seeds, also for the spreading guano; and I do hereby declare that the following is a full, clear, and exact description of the construction and operation of the same, reference being had to the annexed drawings, making a part of this specification, in which—

Figure 1 is an isometrical perspective view; Fig. 2, a horizontal view or plan, showing the interior of the hopper; Fig. 3, a section. Figs. 4 and 5 are feed-wheels or distributing-wheels to be substituted for the wheel R in planting corn or spreading manure.

My invention consists in the combination and arrangement of the various parts, as hereinafter set forth.

A center wheel, R, provided with short arms P P P, revolves with driving-wheels 3 3, being attached to the same axle, and carries the seed down through the hopper H and distributes it along the furrow made by the plow marked 1 and small wheel marked 2. The seed is covered by the drag marked 7, attached to the rear end of the hopper C. Two other forms for distributing-wheels are shown in Figs. 4 and 5—the one in Fig. 5 for planting corn and the one in Fig. 4 for smaller seeds.

F F F is a sliding rack attached to the driving-wheels 3 3. It is provided with spikes or pins $i$ $i$ $i$, inclining toward the center of the hopper C, and covering the distributing-wheel R. As the driving-wheels revolve this sliding rack keeps the seed or grain from clogging and feeds the distributing-wheel uniformly.

What I claim as my invention, and desire to secure by Letters Patent, is—

The sliding rack F F, with inclined pins $i$ $i$, in combination with the distributing-wheel R and driving-wheels 3 3, the whole constructed and arranged substantially as and for the purposes set forth.

L. B. BROWN.

Witnesses:
 NATHAN GORDY,
 B. C. BROWN.